US012525345B2

(12) United States Patent
Takla et al.

(10) Patent No.: US 12,525,345 B2
(45) Date of Patent: Jan. 13, 2026

(54) SYSTEMS AND METHODS FOR DETECTION OF SUBJECT ACTIVITY BY PROCESSING VIDEO AND OTHER SIGNALS USING ARTIFICIAL INTELLIGENCE

(71) Applicant: Dignity Health, San Francisco, CA (US)

(72) Inventors: George Takla, San Francisco, CA (US); Jayadev Hondadkatte Shivayogi, San Francisco, CA (US); Shaung Liu, San Francisco, CA (US); Bethel Orozco, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 413 days.

(21) Appl. No.: 18/254,801

(22) PCT Filed: Dec. 6, 2021

(86) PCT No.: PCT/US2021/062024
§ 371 (c)(1),
(2) Date: May 26, 2023

(87) PCT Pub. No.: WO2022/120277
PCT Pub. Date: Jun. 9, 2022

(65) Prior Publication Data
US 2024/0029877 A1   Jan. 25, 2024

Related U.S. Application Data

(60) Provisional application No. 63/121,489, filed on Dec. 4, 2020.

(51) Int. Cl.
*G16H 40/63* (2018.01)

(52) U.S. Cl.
CPC .................................. *G16H 40/63* (2018.01)

(58) Field of Classification Search
None
See application file for complete search history.

(56) References Cited

U.S. PATENT DOCUMENTS 7,541,935 B2   6/2009 Dring et al.
8,532,737 B2   9/2013 Cervantes
(Continued)

OTHER PUBLICATIONS

European Patent Office, Extended European Patent Office, Application No. 21901610.2, Oct. 1, 2024, 10 pages.
(Continued)

*Primary Examiner* — Dov Popovici
(74) *Attorney, Agent, or Firm* — Polsinelli PC

(57) ABSTRACT

Various embodiments of a system and associated method for detection of subject activity by processing video and other signals using artificial intelligence are shown herein. In particular, a subject monitoring system is shown that monitors subjects using a video-capable camera or other suitable video capture device to identify a subject's status of an individual by monitoring subject actions in real-time. The system further monitors other persons in the room with a subject to identify their actions and identities to ensure safety of the subject and facility while preventing confusion of the system as multiple individuals step in and out of frame over the course of the collected video feed.

21 Claims, 12 Drawing Sheets

(56) References Cited

U.S. PATENT DOCUMENTS

| | | | |
|---|---|---|---|
| 11,100,633 B2* | 8/2021 | Ngo Dinh | G06V 10/82 |
| 2018/0129873 A1 | 5/2018 | Alghazzawi et al. | |
| 2021/0267491 A1* | 9/2021 | Guibene | A61B 5/1128 |
| 2024/0021019 A1* | 1/2024 | Yu | G06T 7/277 |

OTHER PUBLICATIONS

Ahmedt-Aristizabal, D. et al., "Deep Motion Analysis for Epileptic Seizure Classification," International Conference of the IEEE Engineering in Medicine and Biology Society (EMBC), Jul. 18, 2018, pp. 3578-3581.

Amiribesheli, M. et al., "A review of smart homes in healthcare," Journal of Ambient Intelligence and Hunanized Computing, vol. 6, No. 4, Mar. 14, 2015, pp. 495-517.

Islam, M. M. et al., "Deep Learning Based Systems Developed for Fall Detection: A Review," IEEE Access, vol. 8, Sep. 4, 2020, 21 pages.

Popescu, A. et al., "Fusion Mechanisms for Human Activity Recognition Using Automated Machine Learning," IEEE Access, vol. 8, Jul. 30. 2020, pp. 143996-144014.

Rodriguez, P. et al., "Deep Pain: Exploiting Long Short-Term Memory Networks for Facial Expression Classification," IEEE Transactions on Cybernetics, vol. 52, No. 5, May 2022, pp. 3314-3324.

Yao, L. et al., "A fall detection method based on a joint motion map using double convolutional neural networks," Multimedia Tools and Applications, vol. 81, No. 4, Jun. 22, 2020, pp. 4551-4568.

Patent Cooperation Treaty, International Search Report and Written Opinion, International Application No. PCT/US2021/062024, date of mailing Mar. 15, 2022, 14 pages.

Yu, M. et al., "Computer Vision Based Fall Detection by a Convolutional Neural Network," Proceedings of the 19th ACM International Conference on Multimodal Interaction (ICMI '17), Nov. 13-17, 2017, pp. 416-420.

Gorodnichy, D. et al., "Target-based evaluation of face recognition technology for video surveillance applications," 2014 IEEE Symposium on Computational Intelligence in Biometrics and Identity Management (CIBIM) Dec. 9-12, 2014, 8 pages.

Augustyniak, P. et al., "Graph-based representation of behavior in detection and prediction of daily living activities," Computers in Biology and Medicine, vol. 95, Apr. 1, 2018, pp. 261-270.

* cited by examiner

SYSTEMS AND METHODS FOR DETECTION OF SUBJECT ACTIVITY BY PROCESSING VIDEO AND OTHER SIGNALS USING ARTIFICIAL INTELLIGENCE

FIELD

The present disclosure generally relates to subject monitoring, and in particular, to a system and associated method for monitoring subjects by processing video and other signals to identify subjects who are in need of assistance and prevent adverse events.

BACKGROUND

Generally, healthcare practitioners making their rounds are required to monitor multiple subjects at a time in order to prevent or timely respond to adverse events such as falls, seizures, or indications that a subject otherwise requires assistance or intervention. Some facilities employ video feeds to allow a practitioner to remotely monitor many subjects at once, however, when a person is required to equally divide their attention between tens of alerts, vital signs, video feeds, etc. at once they increase the risk of missing details indicative of distress in a subject which can occur unpredictably prior to an adverse event. In addition, current practices require human insight to identify signs of subject distress or movements associated with adverse events, insights which may not be available when a practitioner is tasked with monitoring multiple subjects. For instance, a nurse monitoring more than 20 subjects at a single time needs to prioritize which subjects are on the video screens at a given time, and pay closer attention to three or four subjects whose video feeds are clustered together and might not notice a subject on the other side of the screen trying to leave their bed or grimacing in pain. Further, when an adverse event does occur, communication lapses can happen in which a practitioner responsible for a subject is not notified in time.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
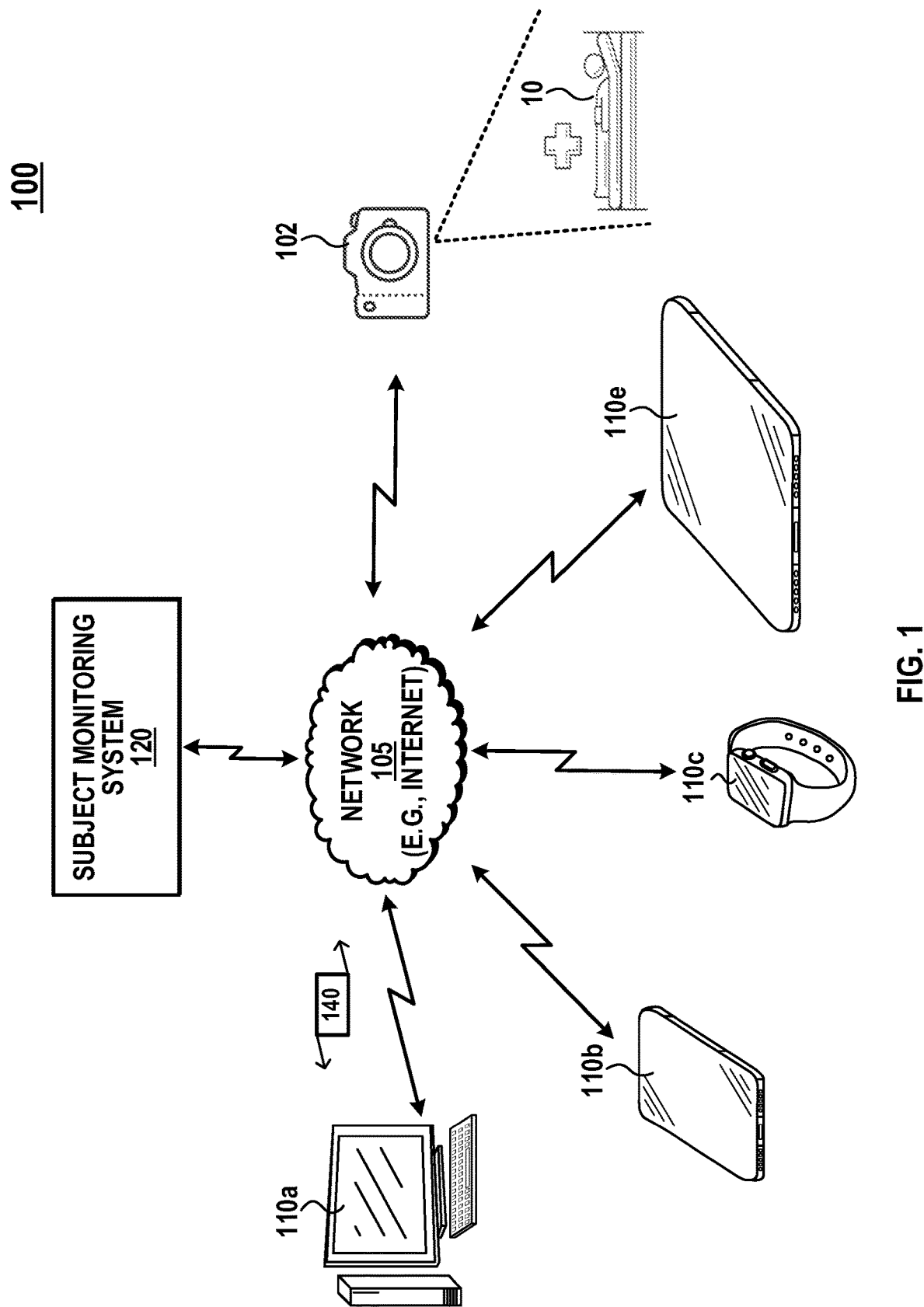
FIG. 1 is a schematic diagram showing a subject monitoring environment.

Various embodiments of a system and associated method for detection of subject activity by processing video and other signals using artificial intelligence are disclosed herein. In particular, a subject monitoring system is disclosed that monitors subjects using a video-capable camera or other suitable video capture device to identify a subject status of an individual by monitoring subject actions subject in real-time. The system further monitors other persons in the room with a subject to identify their actions and identities to ensure safety of the subject and facility while preventing confusion of the system as multiple individuals step in and out of frame over the course of the collected video feed. In some embodiments, the system is operable for pose estimation and facial estimation of a subject, care provider, hospital employee or a visitor (collectively, one or more subjects) to recognize actions, emotions and/or identities of each subject to determine if the subject is at risk for an adverse event or to recognize if an adverse event has already happened. In some embodiments, the subject monitoring system includes an event triage methodology that prioritizes video feeds of each of a plurality of subjects such that an attending nurse can prioritize the subjects that are in need of attention or assistance. In some embodiments, the system identifies an event as an action or emotion that indicates that the subject needs attention or assistance based on actions, emotions, and/or identities that are observed by the system. In particular, the system extracts skeleton joint data for each individual captured within the real-time video feed and processes the skeleton joint data to recognize one or more actions performed by the individual. The system can incorporate a recognized action as a detected event. In some embodiments, data pertaining to a detected event is passed through a rules engine, and the rules engine uses video data and contextual data to process the event, triage the subject, and take mitigative action. Mitigative action can include prioritizing the video feed of the subject and sending an alert to one or more subscribers (nurses, care providers, etc.) to notify that the subject requires assistance. Referring to the drawings, embodiments of a subject monitoring environment are illustrated and generally indicated as 100 in FIGS. 1-11B.

Referring to the drawings, FIG. 1 illustrates a schematic diagram of a subject monitoring environment 100, which includes an example communication network 105 (e.g., the Internet). Communication network 105 is shown for purposes of illustration and can represent various types of networks, including local area networks (LANs), wide area networks (WANs), telecommunication networks (e.g., 4G, 5G, etc.), and so on.

As shown, communication network 105 includes a geographically distributed collection of cameras 102 and client devices, such as devices 110a, 110b, 110c, and 110d, (collectively, "devices 110"). Camera 102 is operable for monitoring a subject 10. Devices 110 are interconnected by communication links and/or network segments and exchange or transport data such as data packets 140 to/from a subject monitoring system 120. Here, devices 110 include a computer 110a, a mobile device 110b, a wearable device 110c, and a tablet 110d. The illustrated client devices represent specific types of electronic devices, but it is appreciated that devices 110 in the broader sense are not limited to such specific devices. For example, devices 110 can include any number of electronic devices such as pagers, laptops, smart watches, wearable smart devices, smart glasses, smart home devices, other wearables, and so on. In addition, those skilled in the art will understand that any number of devices and links may be used in communication network 105, and that the views shown by FIG. 1 is for simplicity and discussion.

Data packets 140 represent network traffic or messages, which are exchanged between devices 110 and subject monitoring system 120 over communication network 105 using predefined network communication protocols such as wired protocols, wireless protocols (e.g., IEEE Std. 802.15.4, WiFi, Bluetooth®, etc.), PLC protocols, or other shared-media protocols where appropriate. In this context, a protocol includes a set of rules defining how devices interact with each other.

Figure 2:
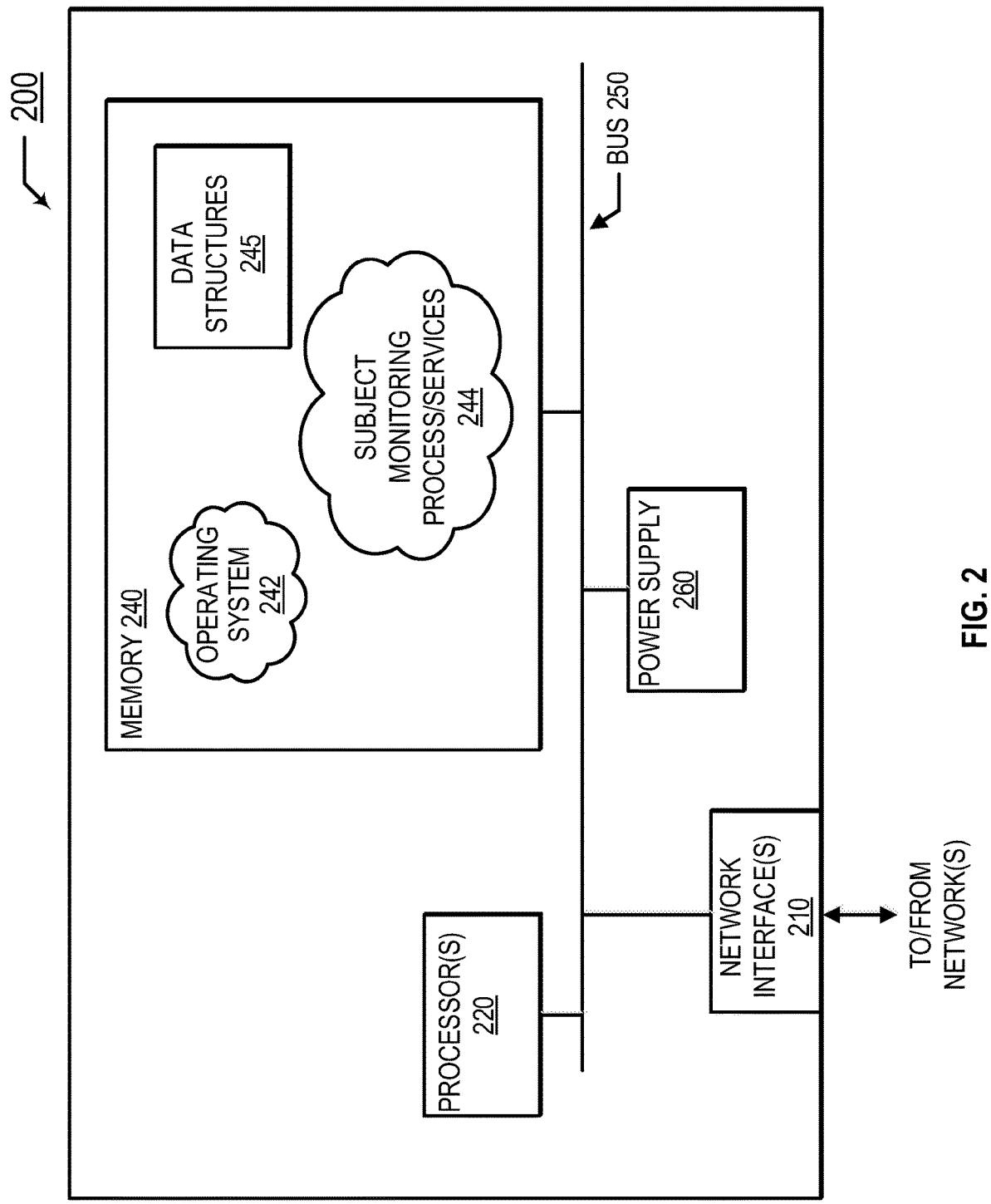
FIG. 2 is a schematic block diagram showing an example device that may be used with the environment of FIG. 1.

FIG. 2 is a schematic block diagram of an example device 200 that may be used with one or more embodiments described herein, e.g., as a component of subject monitoring system 120 and/or as any one of devices 110 shown in FIG. 1.

Device 200 includes one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over the communication links coupled to communication network 105. Network interfaces 210 can be configured to transmit and/or receive data using a variety of different communication protocols. Network interface 210 is shown for simplicity, and it is appreciated that such interface may represent two different types of network connections, e.g., wireless and wired/physical connections. Also, while network interface 210 is shown separately from power supply 260, for PLC the interface may communicate through power supply 260 or may be an integral component of the power supply. In some specific configurations the PLC signal may be coupled to the power line feeding into the power supply.

Memory 240 comprises a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches).

Processor 220 includes hardware elements or hardware logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may comprise subject monitoring process/services 244, described herein. Note that while subject monitoring process/services 244 is shown in centralized memory 240, alternative embodiments provide for the process to be specifically operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the subject monitoring process 244 is shown as a standalone process, those skilled in the art will appreciate that this process may be executed as a routine or module within other processes.

The techniques described herein provide a comprehensive subject monitoring environment 100 that allows a practitioner to prioritize monitoring of subjects based on immediate need. In particular, the subject monitoring platform makes informed decisions based on visually observable actions and contextual data. In this fashion, the subject monitoring platform can help mitigate adverse events by notifying care providers when the subject requires assistance or attention. The subject monitoring environment 100 can include any number of systems (e.g., subject monitoring system 120), devices (e.g., device 200), and processes (e.g., procedure 800).

Figure 3:
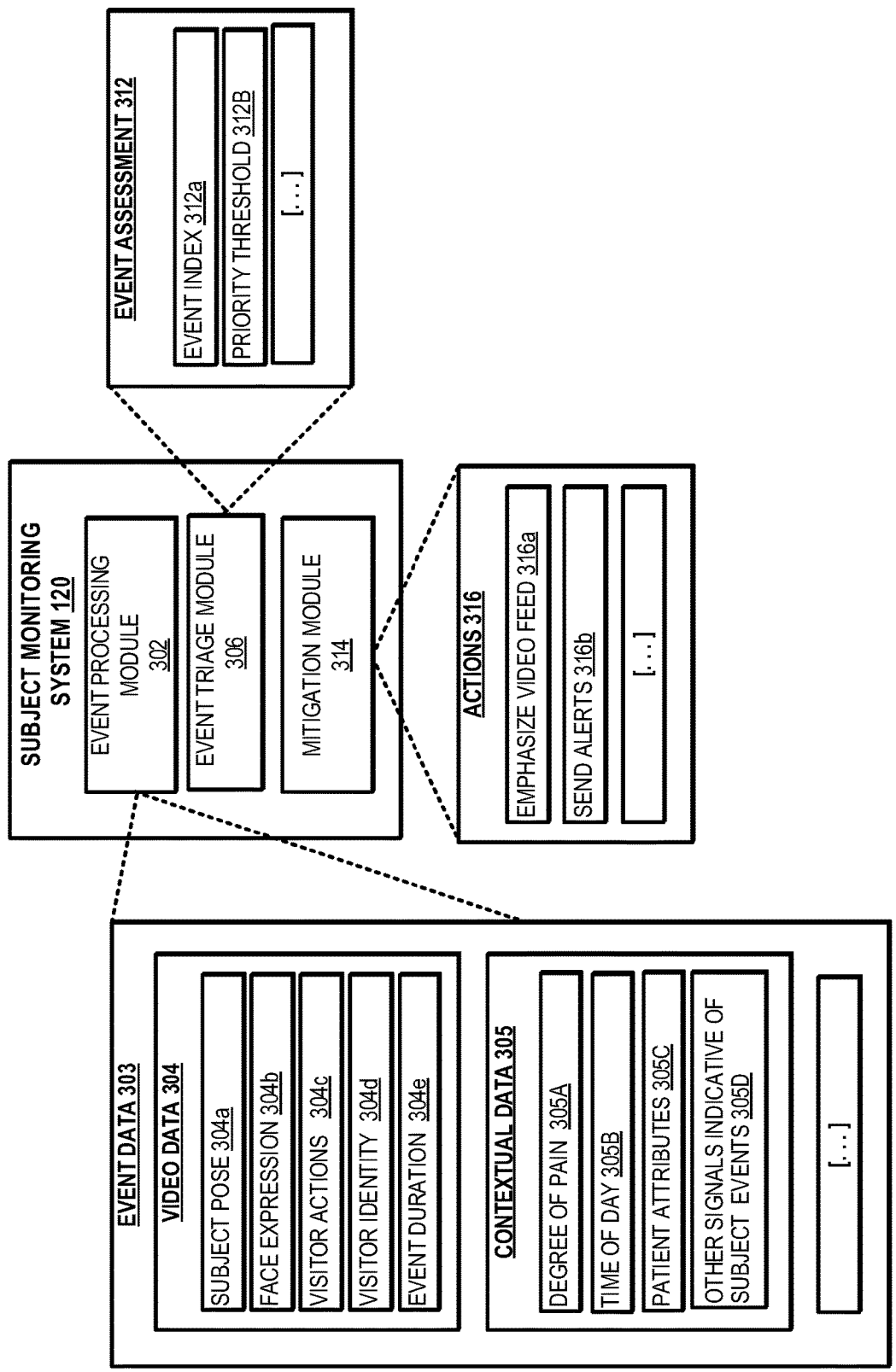
FIG. 3 is a diagram showing a computer-implemented subject monitoring system for use with the subject monitoring environment of FIG. 1 including component modules.
Figure 4:
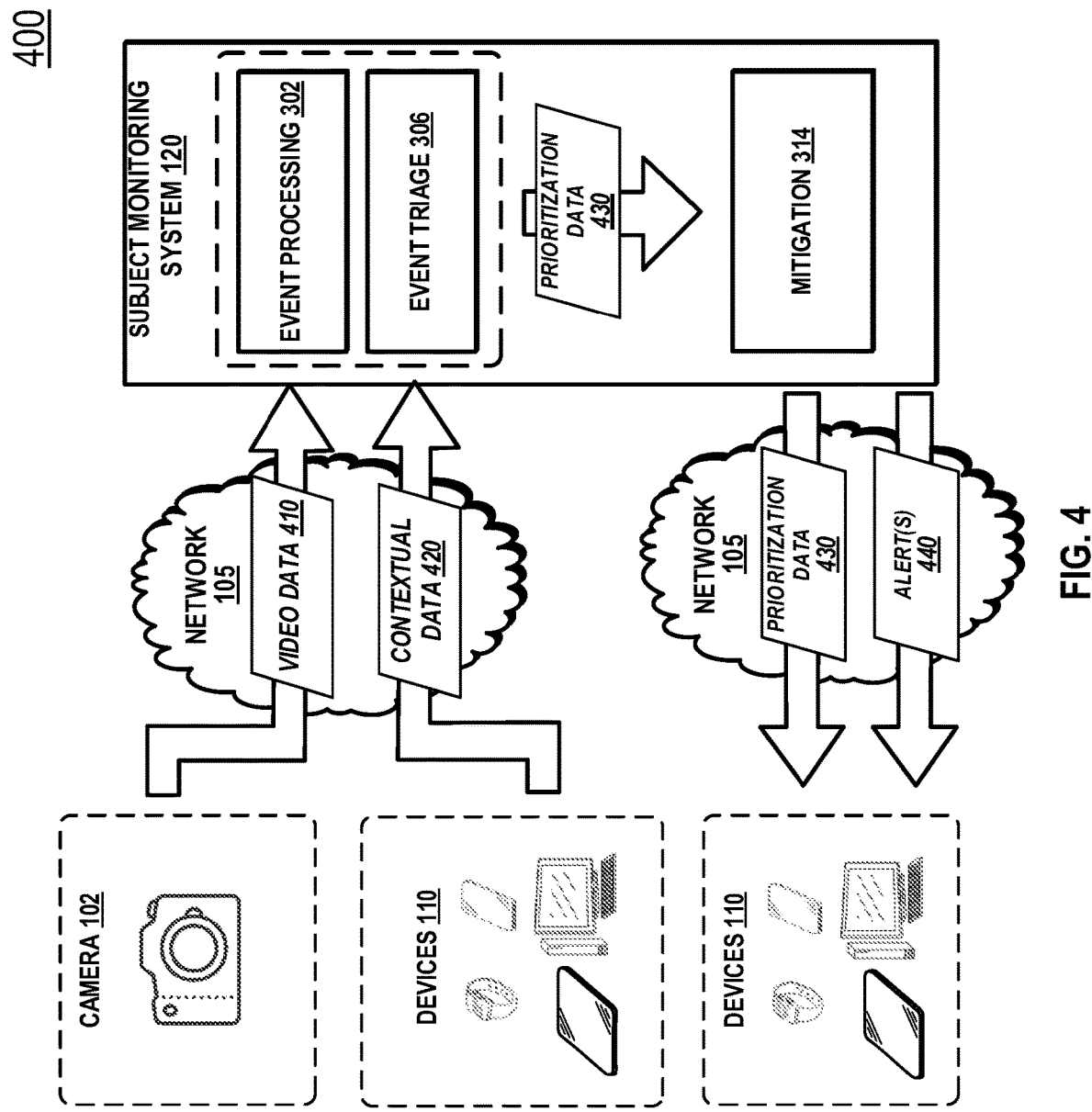
FIG. 4 is a diagram showing a flow of information between various components of the subject monitoring environment of FIG. 1.

Referring again to the figures, FIG. 3 illustrates a schematic block diagram 300, showing component modules of subject monitoring system 120. The component modules of subject monitoring system 120 include an event processing module 302, an event triage module 306, and a mitigation module 314. In operation, event processing module 302 monitors event data 303 including video data 304 featuring a subject captured by camera 102 (FIG. 4). Video data 304 corresponds to observable actions associated with the subject and others in the room with the subject (collectively, subjects). Video data 304 includes data associated with actions and emotions displayed by the subject, as well as actions and identities associated with others in the room, and can be either directly observable or determined by one or more sub-processes based on observable information. Here, video data 304 includes subject pose 304a, subject facial expression 304b, visitor actions 304c, visitor identity 304d, and event duration 304e.

In particular, event processing module 302 identifies subject pose 304a using one or more pose estimation techniques which may include analyzing a plurality of frames of the video data 304 to identity bodily landmarks such as locations of joints and/or limbs relative to each other and estimating a pose performed by the individual. In some examples, event processing module 302 determines a location of at least two bodily landmarks in 2-D space or 3-D space relative to each other to estimate a pose of a subject. In some embodiments, event processing module 302 classifies the pose to indicate an action taken by the subject. For example, event processing module 302 can monitor location of at least two bodily landmarks to indicate events such as subject tugging at an IV, trying to get out of bed, sitting, standing, sleeping, reaching over, falling, etc. Event processing module 302 can employ one or more neural networks or other machine learning elements to classify the pose based on locations of at least two bodily landmarks.

This is described in further detail in a later section of this disclosure corresponding with FIG. 7.

In some embodiments, event processing module 302 further identifies a facial expression 304b of a subject to classify or otherwise identify an emotional state or pain index of a subject. In particular, the event processing module 302 identifies an emotional state or pain index of a subject using one or more facial recognition techniques. In some embodiments, event processing module 302 employs one or more neural networks to recognize an emotional state or pain index of subject based on facial expression 304b. Similarly, event processing module 302 determines an identity 304d of a subject in the room with the subject using one or more facial recognition techniques. In some embodiments, event processing module 302 can also monitor an emotional state of a subject in the room with a subject, assessing agitation levels and other emotional states that may cause harm to the subject. Other video data 304 taken into account by event processing module 302 can include a duration of an event 304e.

Event processing module 302 can further incorporate other event data 303 including contextual data 305. Contextual data 305 represents additional context provided to the video data 304 to allow event processing module 302 and event triage module 306 to make an informed decision about whether video data 304 is indicative of an adverse event or a risk of an adverse event. Contextual data 305 incorporated by event processing module 302 can include a degree of pain 305a exhibited by the subject, a time of day 305b that the event occurred (non-visiting hours, etc), and subject-specific attributes 305c including condition, abilities, complaints, and special instructions (e.g. subject has Tourette's and may be prone to abrupt movements, subject is under sedatives and may be prone to falls, subject needs help using the restroom, subject is under quarantine or requires a sterile environment, etc.). Contextual data 305 can also include other signals indicative of subject events 305d (e.g. audio, biometric data, "call help" button, and so on). Contextual data 305 is a grouping of representative data and may include (or exclude) a number of different factors. For instance, contextual data 305 can also include an assigned ward, practitioner availability, previous incidents or events, and other factors that would impact a subject's need for attention or assistance.

Collectively, as mentioned, event processing module 302 leverages neural networks or other machine learning elements to analyze event data 303 and identify what is happening to a subject. Event data 303 corresponds to an event happening within the vicinity of the subject (e.g. captured by camera 110 of FIG. 4) including visually observable video data 304 and additional contextual data 305. In this fashion, event data 303 represents data captured during the event and/or data that provides context to a condition of a subject and/or indicates a need for assistance or attention.

Event triage module 306 interprets event data 303 including video data 304 and contextual data 305 to determine if the event data 303 is indicative of an adverse event or indicative of a risk of an adverse event. In some embodiments, event triage module 306 assigns an event index 312a to a subject based on event data 303. In a further embodiment, event triage module 306 compares event index 312a with one or more priority thresholds 312b to determine if the subject is in need of assistance and/or to determine if the subject is in greater immediate need of assistance than other subjects. Priority thresholds 312b can be based on event data 303 corresponding to the subject, as well as event data 303 corresponding to other subjects of the plurality of subjects including relativity to event indexes 312a associated with each subject of a plurality of subjects.

Event triage module 306 can employ one or more neural networks or other machine learning components to determine event index 312a based on event data 303. Collectively, event triage module 306 determines an event index 312a for each subject of the plurality of subjects based on event data 303.

Mitigation module 314 executes one or more actions 316 to mitigate an adverse event for each subject of the plurality of subjects based on event index 312a and priority threshold 312b. Actions 316 can include emphasizing a video feed 316a and sending an alert 316B to a care provider directly. In some embodiments, mitigation module 314 re-arranges, highlights, maximizes, or otherwise draws attention to a video feed 316a featuring a subject who may be in need of assistance or intervention. In some embodiments, mitigation module 314 sends one or more alerts 314b to one or more individuals indicating that the subject is in need of assistance or intervention. Alerts 314b may include one or more notifications, alerts, messages, etc. sent to one or more subscribed client devices 110 (FIG. 4). Alerts 314b can be sent to subscribed individuals responsible for the subject such as doctors, nurses, other healthcare providers. In some embodiments, mitigation module 314 notifies subscribed individuals based on the action observed by the event processing module 302. For example, event processing module 302 may indicate that janitorial services or security are needed, and in response, mitigation module 314 sends an alert 314b to a subscribed custodian or security guard.

In some embodiments, mitigation module 314 is operable to stratify one or more actions 316 based on event index 312a associated with the subject. For example, mitigation module 314 can highlight or otherwise emphasize a video feed 316a for a subject with an event index 312a within a particular range for closer viewing if their actions are of mild concern but do not indicate an immediate need for assistance, such as a subject whose facial expression appears uncomfortable but they do not appear to be in immediate danger. In another example, a subject with a very high event index 312a may need immediate help and mitigation module 314 would not only highlight a video feed 316a of the subject but would also send an alert 316b to subscribed individuals.

Collectively, mitigation module 314 performs one or more actions 316 to mitigate an adverse event based on event index 312a associated with the subject. Actions 316 include emphasizing or otherwise drawing attention to a video feed 316a showing a subject whose actions and emotions indicate a need for attention, assistance, or intervention for better remote monitoring of a plurality of subjects. Actions 316 further include sending an alert 316b to one or more subscribed individuals to inform them that a subject requires attention, assistance, or intervention.

FIG. 4 illustrates a schematic block diagram 400 of the subject monitoring system 120 showing subject monitoring and mitigation operations. In operation, subject monitoring system 120 continuously monitors a video feed from one or more cameras 102 (associated with a subject of a plurality of subjects) over network 105 to obtain video data 410 representative of an event captured by camera 102 and contextual data 420 provided by one or more client devices 110. Subject monitoring system 120 further processes, by event processing module 302, contextual data 420 in conjunction with video data 410 to identify indications of distress of the subject or indications of a potential adverse event. Subject monitoring system 120 then determines, by event triage module 306, prioritization data 430 (corresponding to event index 312a and priority threshold(s) 312b) for each subject of the plurality of subjects based on video data 410 and contextual data 420. Based on prioritization data 430, subject monitoring system 120 can perform one or more mitigation actions by mitigation module 314, which can include communicating prioritization data 430 and one or more alerts 440 to one or more client devices 110.

As shown, video data 410 and contextual data 420 are communicated over network 105 to subject monitoring system 120, specifically to event processing module 302, which employs neural networks and other machine learning components to interpret video data 410 and extract poses, facial expressions, identities, and other signals indicative of subject events (FIG. 3) while also considering contextual data 420.

Extracted event data 303 including context data 420 and video data 410 for each subject is then processed through event triage module 306, which generates prioritization data 430 indicative of a priority of each subject relative to other subjects based on extracted event data 304. In some embodiments, prioritization data 430 includes one or more event indexes 312a (FIG. 3) for each subject, with respect to one or more priority thresholds 312b (FIG. 3).

Mitigation module 314 processes prioritization data 430 to determine one or more appropriate mitigation measures which include highlighting video feeds of subjects who require assistance and transmitting one or more alerts 440 to responsible individuals. Prioritization data 430 is sent to devices 110 to prioritize video feeds and highlight video feeds of subjects who may need attention, assistance, and/or intervention. Alerts 440 are generated by mitigation module 314 to notify individuals of subject needs based on prioritization data 430.

Figure 5:
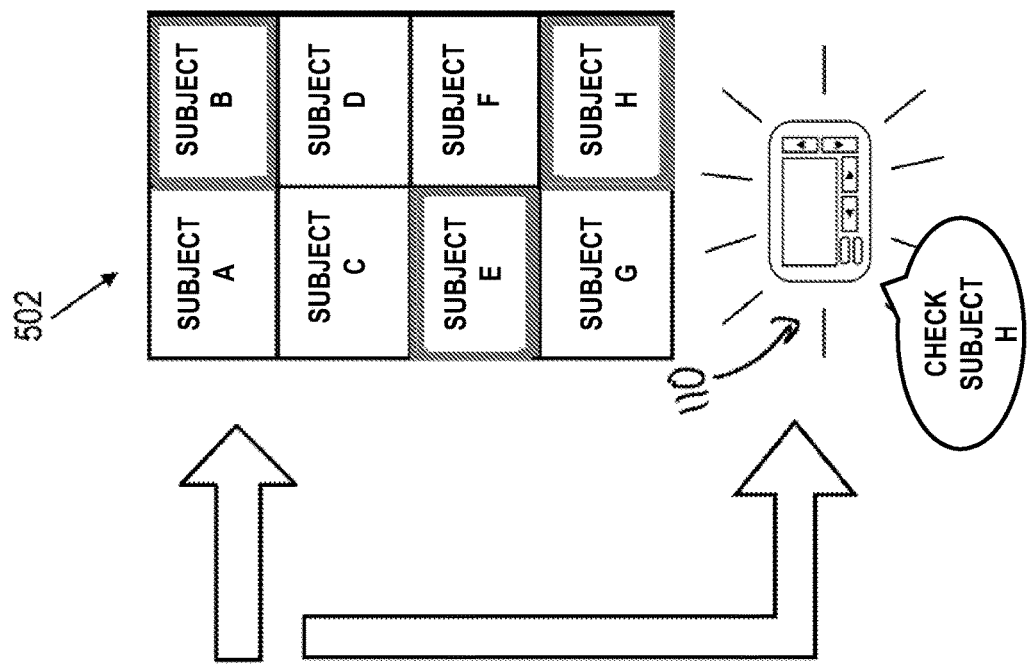
FIG. 5 is a diagram showing an end-to-end example of the subject monitoring environment of FIG. 1.
Figure 5:
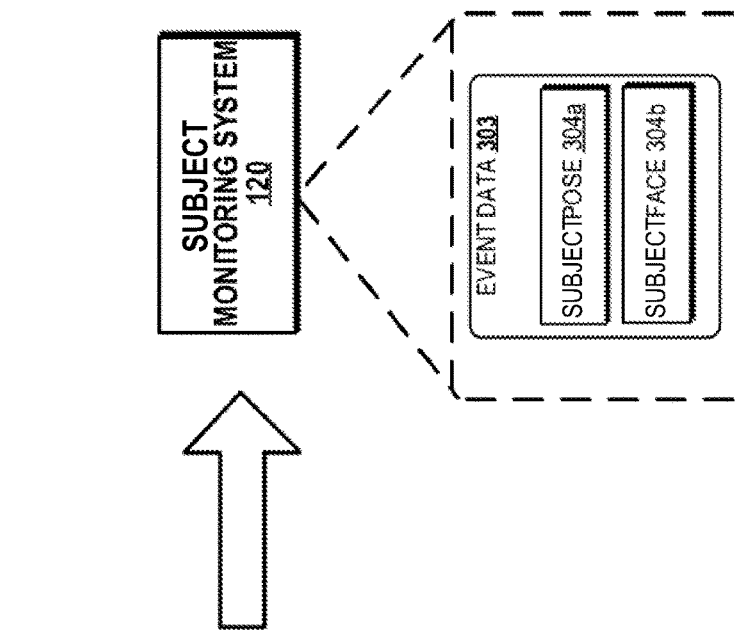
Figure 5:
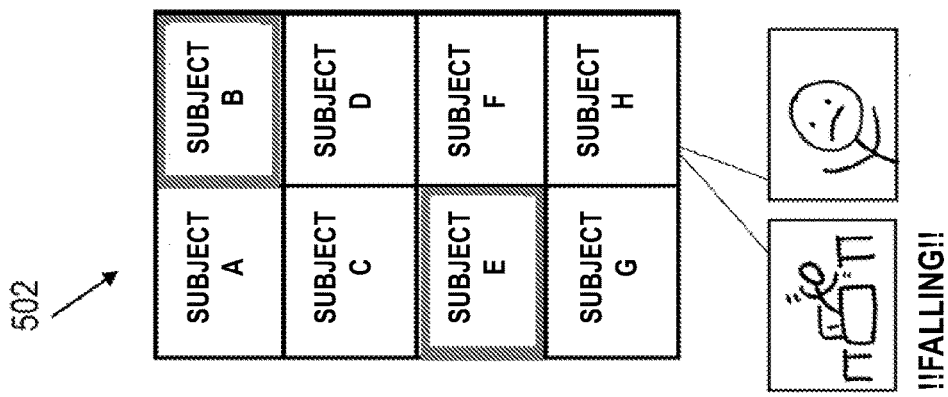

An end-to-end example 500 showing operation of one embodiment the subject monitoring system 120 is illustrated in FIG. 5. An example video gallery 502 is shown, video gallery 502 displaying a plurality of video feeds 502A-H, and each video feed 502A-H corresponding to a hypothetical subjects A-H. As shown, video gallery 502 emphasizes subjects B and E. Suppose video feed 502H shows subject H falling out of bed and showing a pained expression, as illustrated. Subject monitoring system 120 monitors video data 410 (FIG. 4) and contextual data 420 (FIG. 4) and identifies a pose 304a of subject H as "falling" and optionally identifies a facial expression 304b of subject H as "pained". As a result, subject monitoring system 120 updates prioritization data 430 (FIG. 4) to indicate that subject H requires assistance. Video gallery 502 is updated to highlight the video feed 502H showing subject H. Subject monitoring system 120 also sends an alert 440 (FIG. 4) to one or more devices 110 associated with individuals responsible for subject H.

Figure 6:
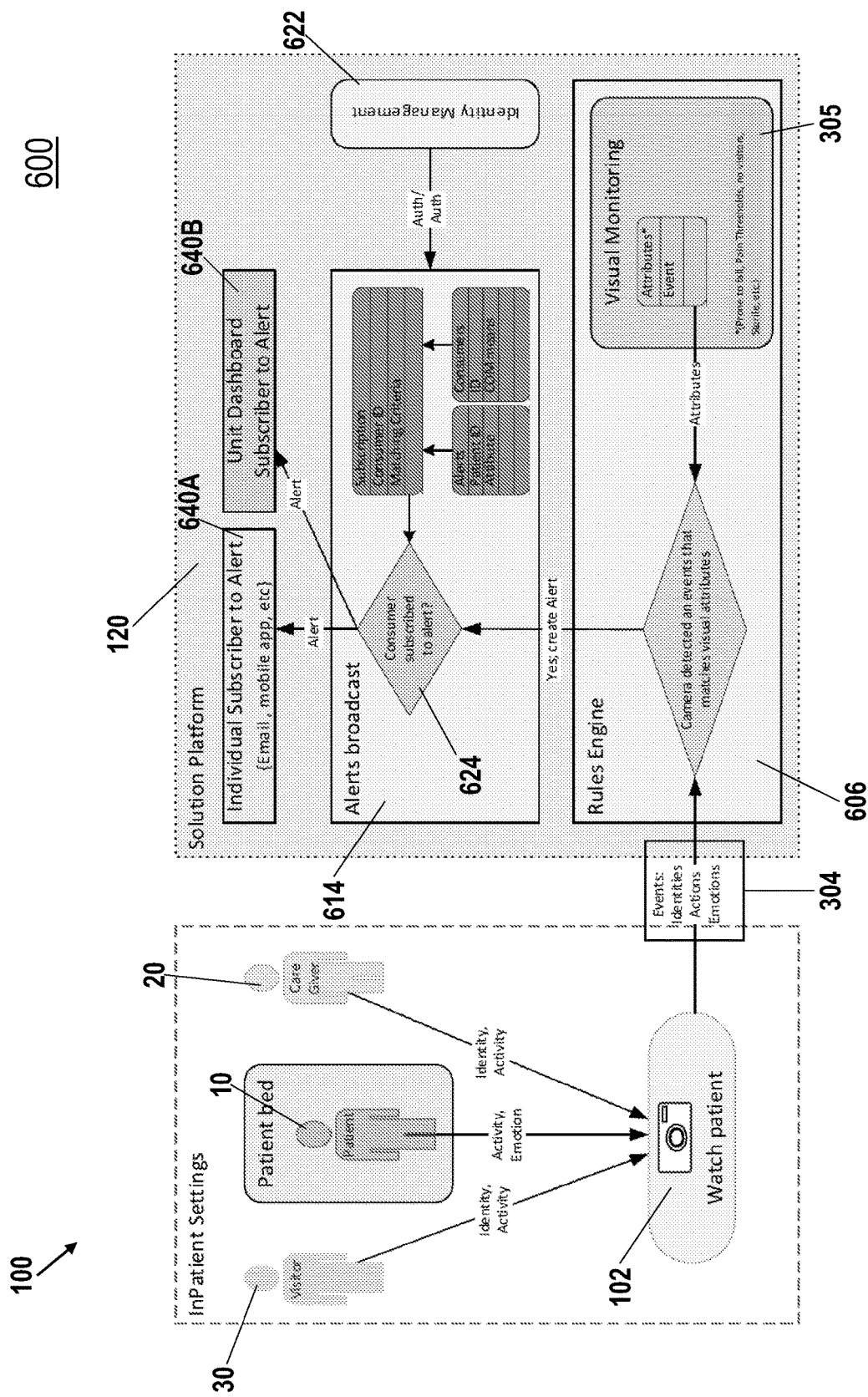
FIG. 6 is a diagram showing one embodiment of the subject monitoring environment of FIG. 1.

FIG. 6 shows a diagram 600 providing another embodiment of subject monitoring environment 100. In particular, subject monitoring environment 100 includes camera 102 oriented towards a subject 10 for capturing event data 304 comprising subject activity and a facial expression indicative of an emotion of subject 10. As shown, in some embodiments, event data 304 can also include an identity and activity of a caregiver 20 and a visitor 30 also captured by camera 102. Event data 304 captured by camera 102 is transmitted to subject monitoring system 120 which includes rules engine 606. Rules engine 606 can, in some embodiments, encompass decision-making modules including event processing module 302 (FIG. 4) and/or event triage module 306 (FIG. 4). Rules engine 606 determines if event data 304 captured by camera 102 corresponds to one or more visual attributes corresponding to an adverse event. If so, then rules engine 606 instructs alerts broadcast module 614 to send an alert to one or more subscribed individuals, which can include aspects of mitigation module 314 or can embody a part of mitigation module 314. Alerts broadcast module 614 communicates with an identity management module 622 to ensure that all who receive an alert regarding a particular subject are authorized to do so. At block 624 of alerts broadcast module 614, alerts broadcast module 614 checks if an individual is "subscribed" to an alert about the subject. If so, then alerts are sent to individual subscribers at block 640A and/or a unit dashboard at block 640B.

Figure 7:
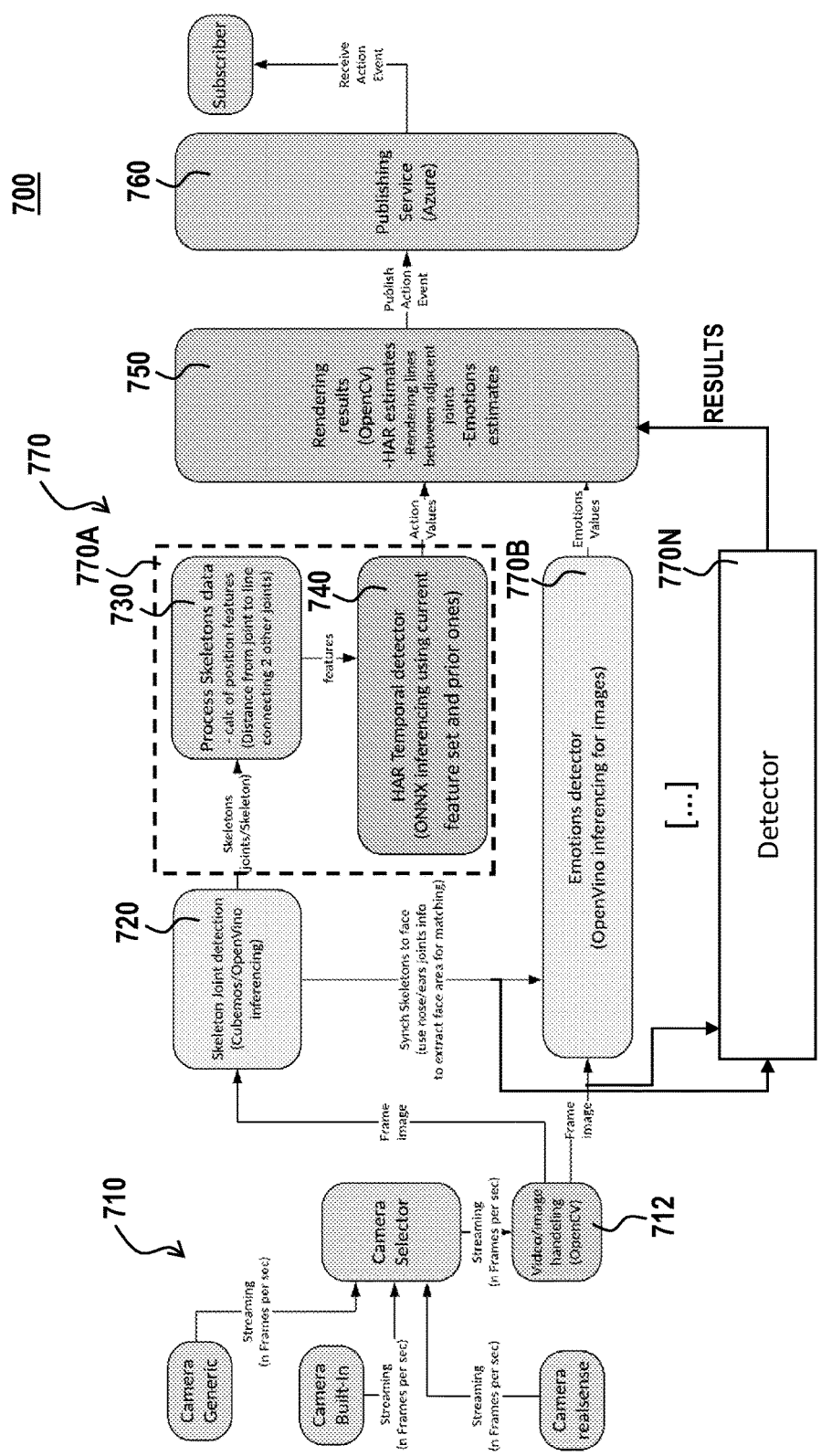
FIG. 7 is a diagram illustrating aspects of the event processing module of FIG. 3.

FIG. 7 illustrates a dataflow diagram 700 that illustrates aspects of the event processing module 302, particularly a human action recognition model to detect near-real time activities of a subject in acute settings. The subject monitoring system 120 determines one or more connected cameras 710 in communication with the computing system 200 operable for capturing a real-time video feed of a subject within a plurality of frames of the real-time video feed. Captured frames were processed and stored at video/image handling model 712. The subject monitoring system 120 loads a skeleton joint detection engine 720, and a Human Action Recognition engine 770A that are collectively operable for detecting a skeleton of each person within the frame, obtaining joint coordinates (x, y and z planes), and calculating features that present spatial characteristics of the subject pose within the determined settings. For each skeleton extracted by the skeleton joint detection engine 720, the feature extraction engine 730 extracts a feature set associated with a frame of a plurality of frames of the real-time video feed. The Human Action Recognition engine 770A takes the feature set associated with the frame along with additional feature sets from prior frames to recognize an action of interest being performed by the skeleton of the subject across the plurality of frames. An HAR Temporal Detector 740 of the subject monitoring system 120 considers an elapsed time taken between feature sets to recognize actions being performed across variable time intervals. Further, the subject monitoring system 120 is operable to identify a particular subject of a plurality of subjects captured within a frame of the real-time video feed using various facial characteristics. In particular, the subject monitoring system 120 tracks joint coordinates, detected actions, and face for each subject of the real-time video feed over time. The tracking process uses coordinates of the eyes and nose to define a rectangular area around the face to be matched from a current frame to a prior frame. This enables the system 120 to correctly identify a particular person identified within two consecutive or non-consecutive frames, such as when a person momentarily steps out of frame. Once the subject monitoring system 120 detects a recognized action, the subject monitoring system 120 posts the recognized action as an event to one or more publishing services 760 in association with the event triage module 306 and/or the mitigation module 314.

In some embodiments, the subject monitoring system 120 can separate a near-real-time processing flow from each of a plurality of detection engines. The detection engines are operable for training and saving in a standard format to be called from the near-real-time process. Additionally, the subject monitoring system 120 can use a Cloud-based API within mitigation module 314 for publishing to subscribers, and can incorporate near-real-time process across different platforms (e.g. Windows, Linux, etc.) to address different settings and function with relatively limited computing resources and limited storage resources.

Dataflow diagram 700 illustrates use of multiple detection engines and algorithms within a pipeline. The skeleton detection engine 720 detects skeletons of subjects within each frame of the real-time video feed and extracts joint coordinates (2D or 3D based on available camera capabilities). The human action recognition model 770A then performs human action recognition on the extracted skeletons including joint coordinates from the skeleton joint detection engine 720 to detect an action being performed based on spatio-temporal characteristics of the extracted skeleton across a plurality of frames. Additionally, the subject monitoring system 120 can include other detection engines 770B-N that utilize the extracted skeleton from the skeleton joint detection engine 720 to recognize or detect other aspects such as emotion detection as described above.

The subject monitoring system 120 combines results from multiple detection engines 770 that utilize the extracted skeleton at a combination module 750. This requires the ability to correctly identify each skeleton captured within the real-time video feed. The subject monitoring system 120 can monitor many skeletons within the real-time video feed at a time and can track, over-time, joints and prior features to each detected skeleton. In particular, skeleton tracking is used to associate the correct individual to detected attributes from different engines that are processing in parallel with one another (e.g. human action recognition and emotion recognition, while being able to tie results from the human action recognition module to the emotion recognition module). Additionally, the subject monitoring system 120 associates past feature sets with a current feature set to capture a temporal displacement of joints. The tracking takes place by means of calculating a rectangular region around the face using an ocular distance extracted by the skeleton joint detection engine 720, and matches this region in order to associate attributes to particular individuals within the real-time video feed.

Feature Set

The human action recognition model 770A of the subject monitoring system 120 extracts a respective feature set for each frame of the plurality of frames. An action is defined in this context by a spatio-temporal feature set that captures the spatial characteristics of a skeleton in certain poses and then uses temporal variations in those distances over time to determine an action being performed by the associated individual. For formulation of the model, a set of features are selected to capture spatial characteristics of skeleton in certain poses. The skeleton joint detection engine 720 detects skeleton joint coordinates (x,y,z) for each skeleton detected on a captured frame of the real-time video feed from the camera. Different methods are used to extract features, however some primary features extracted by a skeletal feature extraction engine 730 include distances from joints to connecting lines, a three joints plane angle, and a two joints line angle. In some embodiments, the skeletal feature extraction engine 730 calculates distances from joints to connecting lines between other joints in real time using this formula:

$$|(J-J_1) \times (J-J_2)|/|(J_1-J_2)|$$

where J is a joint coordinate (x,y,z), and J1, J2 are indicative of two other joints at the ends of the line $(x_1, y_1, z_1)$ and $(x_2, y_2, z_2)$. In case a 2D camera is used, the z coordinate is set to zero. x is the cross-product and | . . . | is the norm value.

A set of 8 distances presents the features (a-h) extracted and used by skeletal feature extraction engine 730. The set includes the distance JL-d between following joint and lines that were found to be best presentation (at the point) to subject in a hospital bed:

| | | | |
|---|---|---|---|
| i. | #a. | JL-d1: Nose | and Line{RKnee, LKnee} |
| ii. | #b. | JL-d2: Jugularnotch | and Line{{RKnee, LKnee} |
| iii. | #c. | JL-d3: RShoulder | and Line{{RKnee, LKnee} |
| iv. | #d. | JL-d4: LShoulder | and Line{{RKnee, LKnee} |
| v. | #e. | JL-d5: RKnee | and Line{RShoulder, LShoulder} |
| vi. | #f. | JL-d6: LKnee | and Line{RShoulder, LShoulder} |
| vii. | #g. | JL-d7: RAnkle | and Line{RShoulder, LShoulder} |
| viii. | #h. | JL-d8: LAnkle | and Line{RShoulder, LShoulder} |

The skeletal feature extraction engine 730 computes plan angles of three joints to connecting lines to two adjacent joints in real time using this formula:

$$(J-J_1) \times (J-J_2)/|(J-J_1) \times (J-J_2)|$$

Six plans are used where each plan has 3 angles presenting its norm vector. The set includes the plan angles JP-a between following joint and adjacent joints that were found to be best presentation (at the point) to subject in a hospital bed.

| | | | |
|---|---|---|---|
| i. | #aPa. | JP-a1: RShoulder | and Joints{LShoulder, RHip} |
| ii. | #bPa. | JP-a2: RShoulder | and Joints{LShoulder, LHip} |
| iii. | #cPa. | JP-a3: RHip | and Joints{{LHip, RKnee} |
| iv. | #dPa. | JP-a4: RHip | and Joints{{LHip, LKnee} |
| v. | #ePa. | JP-a5: RKnee | and Joints{LHip, RAnkle} |
| vi. | #fPa. | JP-a6: RKnee | and Joints{LHip, LAnkle} |

The skeletal feature extraction engine 730 computes line angles of four pair of joints in real time using this formula:

$$(J_1-J_2)/|(J_1-J_2)|$$

where $J_1$, $J_2$ is a pair of joints coordinate (x, y, z) and | . . . | is a norm value.

Three lines are used where each line has 3 angles presenting its norm vector. The set includes the four angles JL-a of line connecting pairs of joints that were found to be best presentation (at the point) to subject in a hospital bed

| | | | |
|---|---|---|---|
| i. | #aLa. | JL-a1: RShoulder | and Joint{LShoulder} |
| ii. | #bLa. | JL-a2: RHip | and Joint{LHip} |
| iii. | #cLa. | JL-a3: RKnee | and Joint{LKnee} |

Other sets of calculated features were examined for other activities such as sitting, standing, and lying down, moving out of bed or frame, placing one leg out, etc. While each feature set captures the spatial characteristics of a pose, the temporal aspect is naturally presented in the data by the variations from feature set to the following one. Therefore, in some embodiments, a capture time is recorded for each feature set in milliseconds.

It should be noted that the feature sets illustrated above are representative of one embodiment of the subject monitoring system 120, and that further geometric features can be extracted from skeleton data as needed or as permitted by resource usage.

Labeling the Feature Set

For development of one embodiment of the subject monitoring system 120, a special set of tools were developed to capture a training set of data from simulated subject-room settings in Tech-Lab. A person's movements while in bed and while moving out of the bed were recorded by cameras 710 and captured frames were processed and stored at video/image handling model 712. The frames were processed to get the joints coordinated (x, y, z) and features {JL-d1–JL-d8}, {JP-a1–JP-a6}, and {JL-a1–JL-a4} defined prior to a current feature set. Each frame was manually examined to define a relevant state of interest from this set {LayDownonBed, SittingonBed, LegOutofBed, MovingOutfromBed, and StandingAwayfromBed}, although it should be noted that additional states of interest can be identified based on captured features. Each feature set per frame is labeled by the manually recorded state to be used for training later on. In some embodiments, each feature set includes the capture time in milliseconds.

AI Model

The subject monitoring system 120 includes a human action recognition (HAR) temporal detector 740 in communication with the skeletal feature extraction engine 730 utilizes a derived model of Long-Short Term Memory (LSTM) units within a Recurrent Neural Network (RNN) implemented by the HAR temporal detector 740 to identify an action being performed by a subject based on the extracted features captured from the plurality of frames of the real-time video feed and avoid a vanishing gradient problem. A sequence of five feature sets are used to feed five LSTM neurons of the RNN, where each feature set presents one or more spatial characteristics of a pose captured within a single frame and the sequence of five LSTM neurons captures the temporal variations over a plurality of frames to recognize an action. It should be noted that while the listed example notes five LSTM neurons processing five feature sets, the HAR temporal detector 740 is not limited to five and can include more or fewer LSTM neurons depending on the complexity of the actions to be recognized or depending on resource availability of the subject monitoring system 120.

It is expected that elapsed times between the two sequential feature sets is not fixed. This variation is not expected by LSTM model by design, therefore, the HAR temporal detector 740 includes a modified LSTM model that introduces variable-time awareness in the training and recognition process. The elapsed time is used to directly adjust the current memory by additional factor "Delta" using preset weights that were not subject to learning during training.

$$\text{Delta}=(1-(0.01*\text{elapsed\_time})*\text{Tanh}(\text{current\_memory})$$

Training

Some embodiments of the subject monitoring system 120 use a regular training process where ~1400 feature sets are batched in sequence groups of fives. Different parameters of layers number of neurons, batch length, train/test split, and number of epochs are examined by performing many trials to select the most favorable results. The batches are presented in each epoch randomly to avoid trapping at local minima. This randomness leads to oscillation convergence on good accuracy where the final produced model could by slightly lower than the prior best accuracy. Therefore, the training process saves the model values whenever maximum value is achieved during the training process, and this best-accuracy model not necessary the final model calculated at the last epoch.

As further shown, the subject monitoring system 120 is stackable; results of multiple detection engines 770 including human action recognition model 770A and emotion detection model 770 can be combined at combination engine 750 to yield event data 303 (FIG. 3). It should be noted that the pipelining configuration shown in FIG. 7 enables stacking of other real-time detection models that utilize the skeletons provided by skeleton joint detection engine 720 to provide additional results to the combination engine 750 and enables incorporation of these additional results into the event data 303 for additional context. Event data 303 is used by the event triage module 306 to make a decision about whether to generate an alert based on the observed event data. If necessary, the event triage module 306 provides an input to mitigation module 314, which can publish the alert to one or more subscribers by publishing service 760.

Figure 8C:
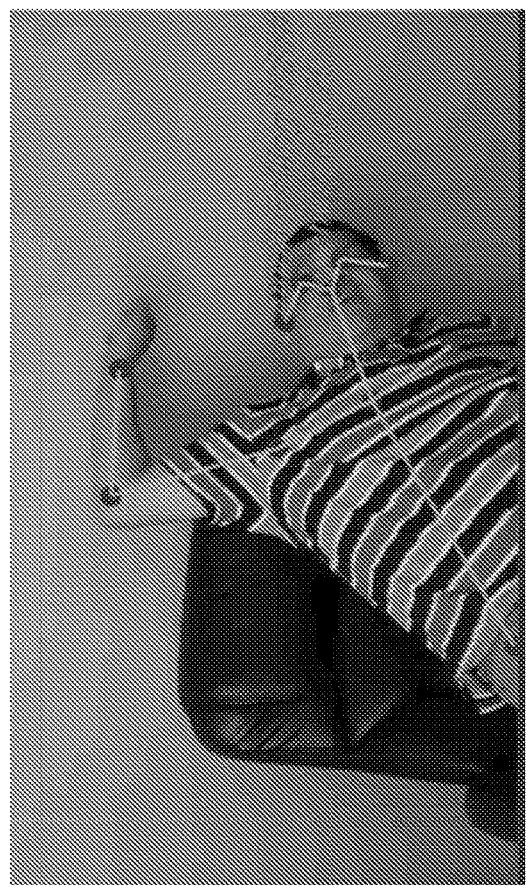
FIGS. 8A-8C are screenshots showing pose estimation of a subject as performed by the subject monitoring environment of FIG. 1.
Figure 8A:
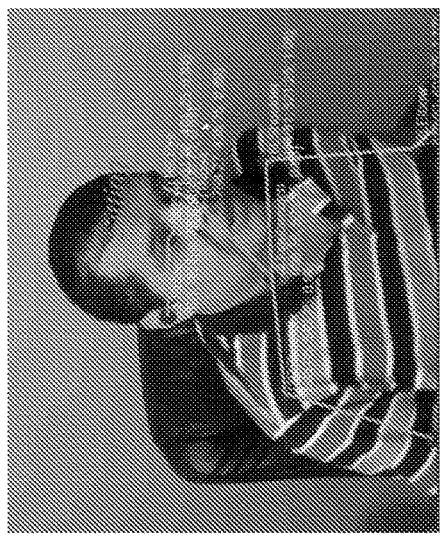
Figure 8B:

FIGS. 8A-8C show one embodiment of pose estimation and recognition of the subject monitoring environment 100 for a subject. As shown, in some embodiments, event processing module 302 (FIG. 3) determines locations of joints in 3-D space relative to each other based on video data 304 (FIG. 3) captured by camera 102 (FIG. 4). One or more neural networks or other machine learning elements may be employed to recognize a pose of the subject based on the locations of joints or other bodily landmarks in 3-D space relative to each other. Neural networks or other machine learning components can be trained on datasets of similar pose estimation data and can also be configured for continual learning.

Figure 9B:
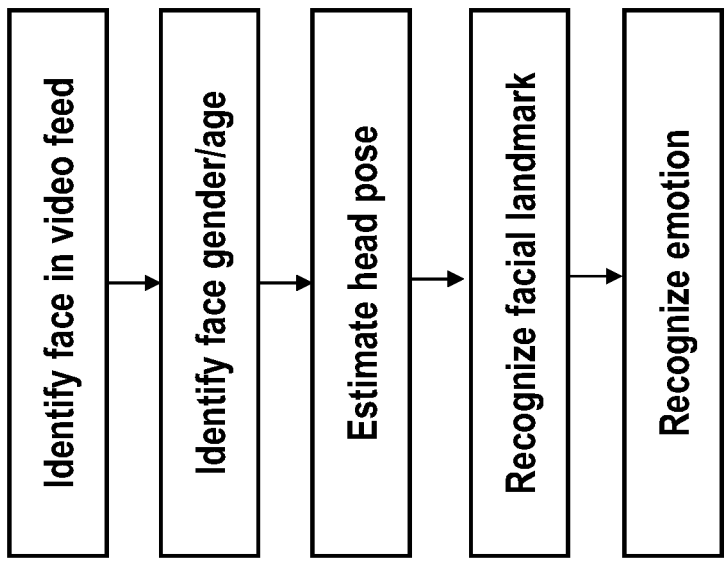
FIGS. 9A and 9B are a respective screenshot and flowchart showing facial estimation of a subject as performed by the subject monitoring environment of FIG. 1.
Figure 9A:
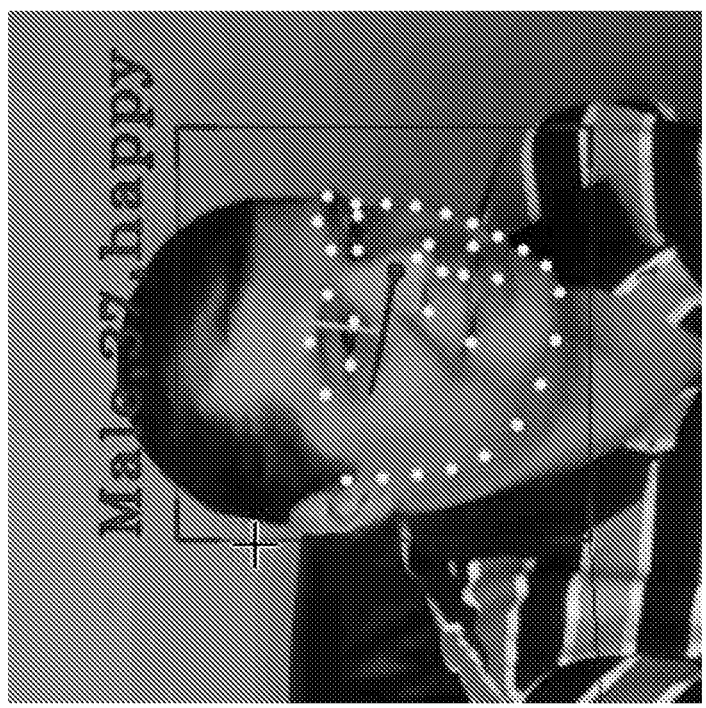

Referring to FIGS. 9A and 9B, one embodiment of facial recognition and emotion recognition is shown for the subject monitoring environment 100. As shown, event processing module 302 (FIG. 3) identifies a face of a subject based on video data 304 (FIG. 3) captured by camera 102 (FIG. 4). Event processing module 302 estimates or otherwise identifies one or more facial attributes of the subject including an apparent gender and/or age, a head pose, and one or more facial landmarks of the subject captured by camera 102. Event processing module 302 then recognizes an emotion exhibited by the subject based on the one or more facial attributes. As discussed above, event processing module 302 employs one or more neural networks or other machine learning components to estimate and/or identify facial attributes and an emotion of the subject. Neural networks or other machine learning components can be trained on datasets of similar facial estimation data and can also be configured for continual learning.

Figure 10:
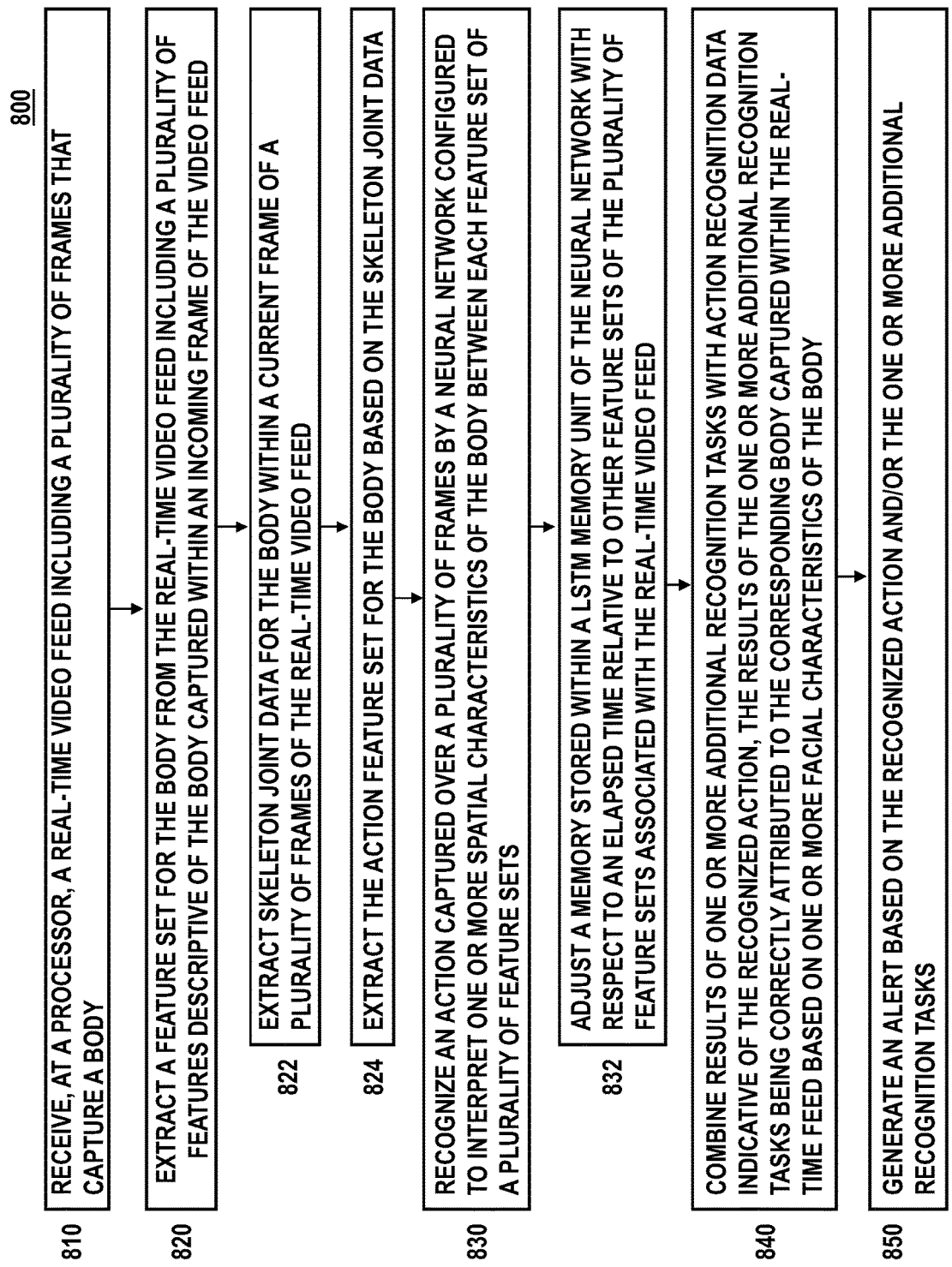
FIG. 10 is a flowchart showing a method for employing the subject environment monitoring environment of FIG. 1.

Referring to FIG. 10, a process flow 800 is shown for execution of the subject monitoring environment 100. At block 810, event processing module 302 (FIG. 3) receives video data 304 including a real-time video feed for a subject (i.e. subject, visitor, care provider) from a video-capable camera 102 (FIG. 4) oriented towards the subject. At block 820, event processing module 302 extracts a feature set for the subject from the real-time video feed including a plurality of features descriptive of the body captured within an incoming frame of the video feed. Sub-block 822 of block 820 shows extracting skeleton joint data for the body within a current frame of the plurality of frames of the real-time video feed. This step can involve determining facial characteristics of the subject including an ocular distance of the face, to aid in identifying multiple skeletons within the frame. At sub-block 824 of block 820, HAR temporal engine 740 extracts a feature set for the body based on the skeleton joint data. subject At block 830, HAR temporal engine 740 recognizes, by a neural network of the processor, an action captured over a plurality of frames, the neural network configured to interpret one or more spatial characteristics of the body between each feature set of a plurality of feature sets. As new feature sets are extracted for each frame over a plurality of frames that may vary in elapsed time relative to one another, HAR temporal engine 740 adjusts a memory stored within a LSTM unit of the neural network with respect to an elapsed time relative to other feature sets of the plurality of feature sets associated with the real-time video feed. At block 840, event triage module 306 (FIG. 3) combines results of one or more additional recognition tasks with action recognition data indicative of the recognized action, the results of the one or more additional recognition tasks being correctly attributed to the corresponding body captured within the real-time feed based on one or more facial characteristics of the body. In particular, the event triage module 306 determines an event index 312a (FIG. 3) based on video data 304 including pose estimation, facial estimation, and contextual data 305. At block 850, the mitigation module 316 generates an alert 440 (FIG. 4) based on the recognized action (event index 312a) which can include phone calls, text messages, pager notifications, application program interface (API) notifications, alerts, sounds, vibrations, haptic feedback, etc. Further, the mitigation module 316 can update a monitoring interface 502 (FIG. 5) associated with one or more devices 110 based on event index 312a to draw attention to the subject.

Results

The model best-accuracy achieved is 99.33%, where the final accuance was 99.18. The model is then used to recognize the action for all the entire dataset (~1400 feature sets), where the confusion matrix between true action and detected one was determined for the final model and best-accuracy one.

Figure 11A:
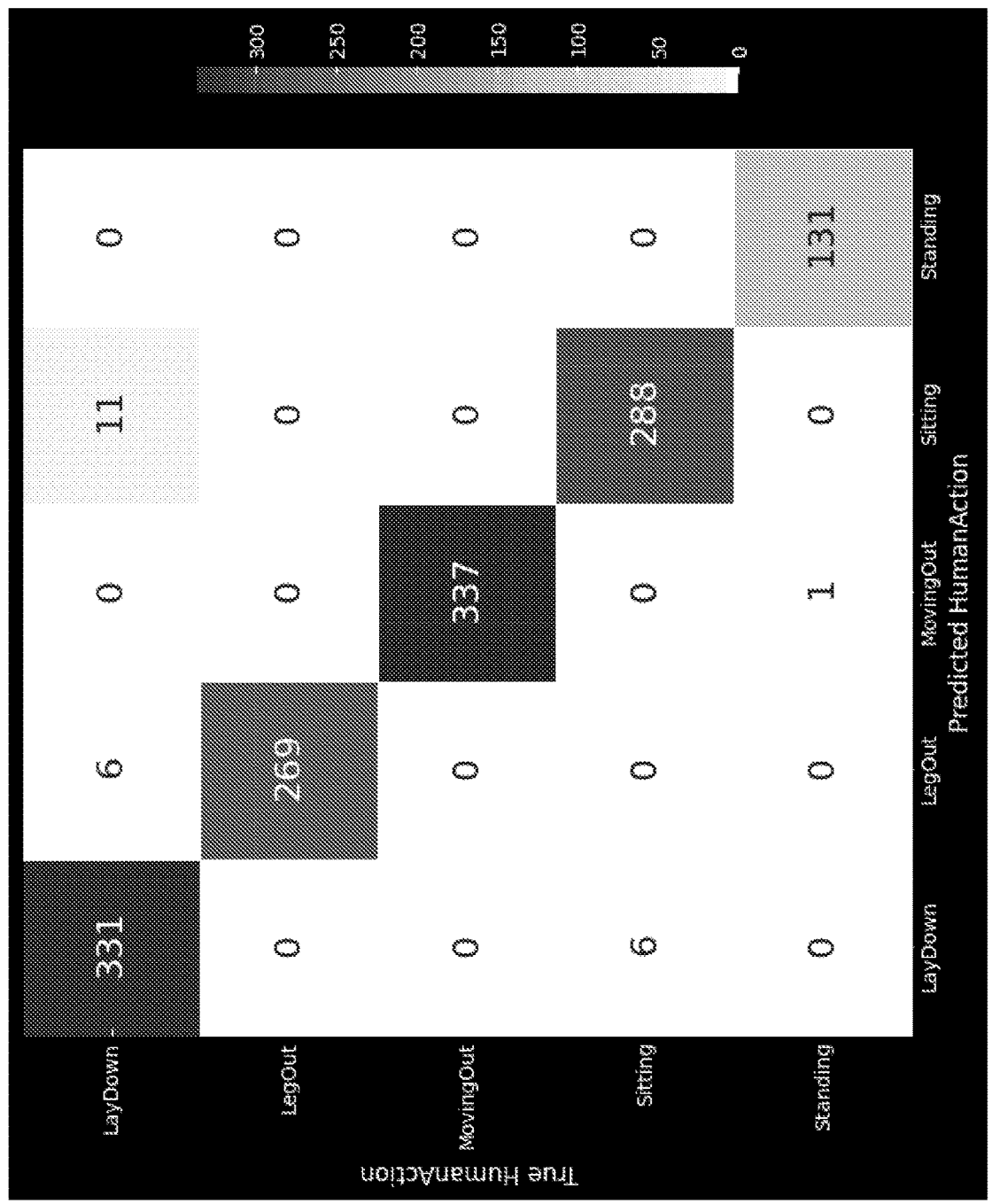
FIGS. 11A and 11B are respective confusion matrices showing results for a final model and a best-accuracy model of the event processing module of FIG. 3.
Figure 11B:
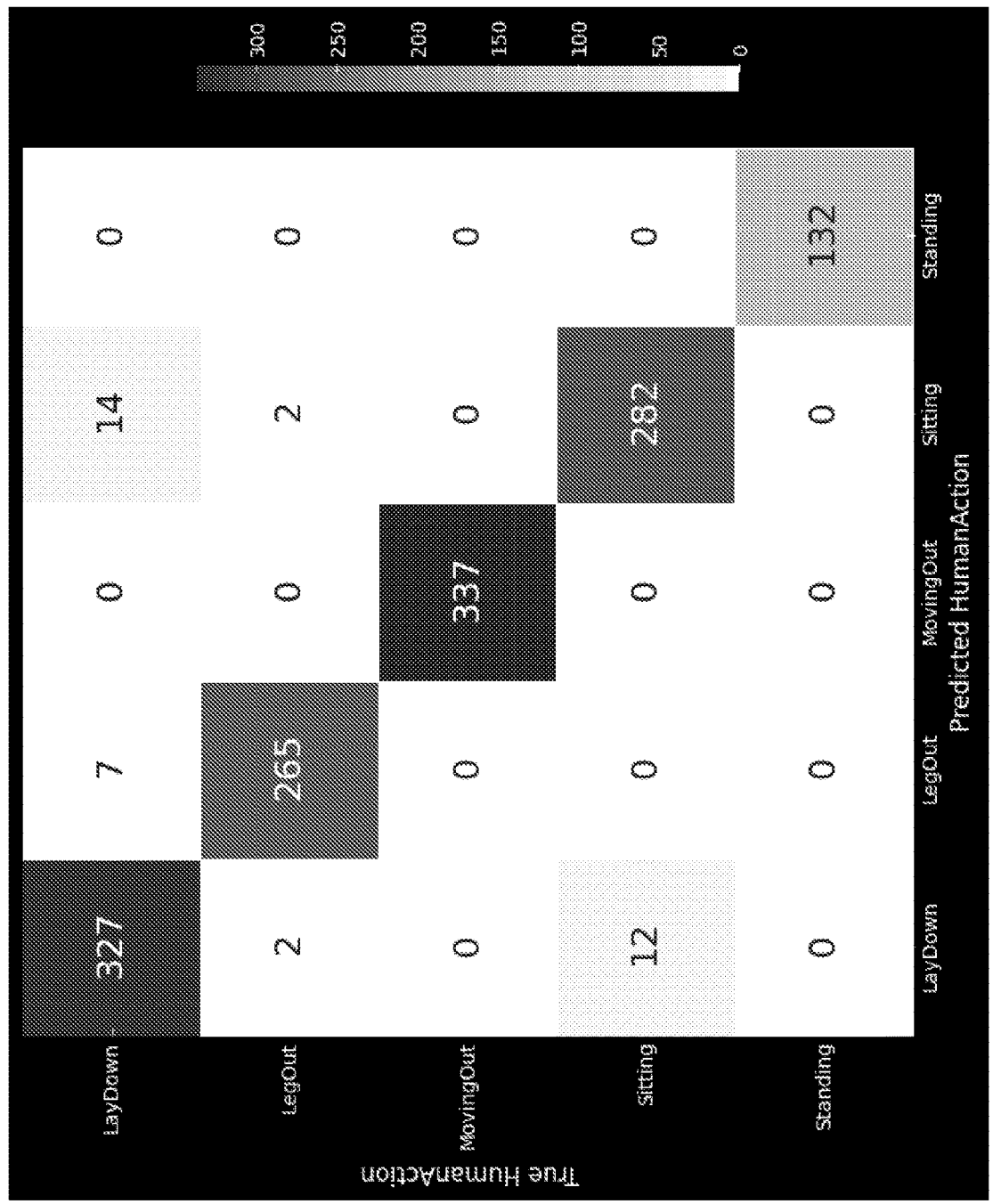

A confusion matrix for the final model is shown in FIG. 11A.
  ix. The measured accuracy of the model is 97.62%.
  x. LayDown: 331/357 correct
  xi. LegOut: 269/269 correct
  xii. MovingOut: 337/337 correct
  xiii. Sitting: 288/294 correct
  xiv. Standing: 131/132 correct A confusion matrix for the best-accuracy model is shown in FIG. 11B.
  i. The measured accuracy of the model is 96.69%.
  ii. LayDown: 327/357 correct
  iii. LegOut: 265/269 correct
  iv. MovingOut: 337/337 correct
  v. Sitting: 282/294 correct For near-real time detection, the HAR temporal engine 740 is saved in ONNX format. A real-time process of the system 100 loads model files using ONNX to detect the calculated distances of the current frame and the 4 prior frames (five sets of the 8 features described earlier).

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A system, comprising:
  a processor in communication with a memory, the memory including instructions, which, when executed, cause the processor to:
    receive a real-time video feed including a plurality of frames that capture a body;
    extract a feature set for the body from the real-time video feed including a plurality of features descriptive of the body captured within an incoming frame of the plurality of frames of the video feed;
    recognize, by a neural network of the processor, an action captured over the plurality of frames, the neural network configured to interpret one or more spatial characteristics of the body between each feature set of a plurality of feature sets, each feature set corresponding with a respective frame of the plurality of frames of the video feed; and
    generate an alert based on the recognized action.

2. The system of claim 1, wherein the memory includes instructions, which, when executed, further cause the processor to:
  extract skeleton joint data for the body within a current frame of a plurality of frames of the real-time video feed; and
  extract the feature set for the body based on a geometry of the skeleton joint data.

3. The system of claim 1, wherein the memory includes instructions, which, when executed, further cause the processor to:
  extract an ocular distance for the body from a first frame of the real-time video feed; and
  identify the body within a second frame of the real-time video feed based on the extracted ocular distance for the body.

4. The system of claim 2, wherein the memory includes instructions, which, when executed, further cause the processor to:
  apply one or more additional recognition tasks for the body over the plurality of frames using the extracted skeleton joint data; and
  combine results of the one or more additional recognition tasks with action recognition data indicative of the recognized action, the results of the one or more additional recognition tasks being correctly attributed to a corresponding body captured within the real-time video feed based on one or more facial characteristics of the body.

5. The system of claim 1, wherein the memory includes instructions, which, when executed, further cause the processor to:
  recognize the action being performed by the body using a current feature set and a plurality of prior feature sets from one or more previous frames of the real-time video feed with consideration for a variation in elapsed time between frames of the real-time video feed.

6. The system of claim 5, wherein the neural network is a recurrent neural network including a plurality of long short term memory (LSTM) units, each LSTM unit configured to store a current memory of a feature set of the plurality of feature sets and directly adjust the current memory stored therein with respect to an elapsed time relative to other feature sets of the plurality of feature sets associated with the real-time video feed.

7. The system of claim 1, wherein the memory includes instructions, which, when executed, further cause the processor to:
  extract one or more facial characteristics of the body for correct attribution of the body across multiple frames of the real-time video feed.

8. The system of claim 7, wherein the one or more extracted facial characteristics include an ocular distance that defines a rectangle area around a face of the body captured within the real-time video feed to match the face from a first frame of the plurality of frames to a second frame of the plurality of frames of the real-time video feed.

9. The system of claim 1, further comprising:
  a display in communication with the processor configured to display the alert based on the recognized action.

10. The system of claim 1, further comprising:
a mitigation module in association with the processor and configured to broadcast the alert to one or more additional devices.

11. A method, comprising:
receiving, at a processor, a real-time video feed including a plurality of frames that capture a body;
extracting a feature set for the body from the real-time video feed including a plurality of features descriptive of the body captured within an incoming frame of the video feed;
recognizing, by a neural network of the processor, an action captured over the plurality of frames, the neural network configured to interpret one or more spatial characteristics of the body between each feature set of a plurality of feature sets; and
generating an alert based on the recognized action.

12. The method of claim 11, further comprising:
adjusting a memory stored within a long short term memory unit of the neural network with respect to an elapsed time relative to other feature sets of the plurality of feature sets associated with the real-time video feed.

13. The method of claim 11, further comprising:
broadcasting the alert to one or more additional devices in communication with the processor.

14. The method of claim 11, further comprising:
applying one or more additional recognition tasks for the body over the plurality of frames using extracted skeleton joint data; and
combining results of the one or more additional recognition tasks with action recognition data indicative of the recognized action, the results of the one or more additional recognition tasks being correctly attributed to a corresponding body captured within the real-time video feed based on one or more facial characteristics of the body.

15. The method of claim 14, further comprising:
generating the alert based on the results of the one or more additional recognition tasks.

16. The method of claim 11, further comprising:
extracting skeleton joint data for the body within a current frame of the plurality of frames of the real-time video feed; and
extracting the feature set for the body based on the skeleton joint data.

17. A system, comprising:
a processor in communication with a memory, the memory including instructions, which, when executed, cause the processor to:
receive a real-time video feed including a plurality of frames that capture a body;
extract a feature set for the body from the real-time video feed including a plurality of features descriptive of the body captured within an incoming frame of the video feed;
recognize, by a neural network of the processor, an action captured over the plurality of frames, the neural network configured to interpret one or more spatial characteristics of the body between each feature set of a plurality of feature sets captured across the plurality of frames with respect to an elapsed time between each frame of the plurality of frames; and
generate an alert based on the recognized action.

18. The system of claim 17, wherein the neural network is a recurrent neural network including a plurality of long short term memory (LSTM) units, wherein each LSTM unit stores a current memory of a feature set of the plurality of feature sets.

19. The system of claim 18, wherein each LSTM unit of the plurality of LSTM units is configured to directly adjust the current memory stored therein with respect to an elapsed time relative to other feature sets of the plurality of feature sets associated with the real-time video feed.

20. The system of claim 18, wherein a feature set of the plurality of feature sets corresponds to a respective frame of the plurality of frames of the real-time video feed.

21. The system of claim 18, wherein the memory includes instructions, which, when executed, further cause the processor to:
extract skeleton joint data for the body within a current frame of the plurality of frames of the real-time video feed; and
extract the feature set for the body based on the skeleton joint data.

* * * * *